United States Patent
Solomon Jr.

(10) Patent No.: US 7,174,829 B2
(45) Date of Patent: Feb. 13, 2007

(54) ADJUSTABLE PISTON PUMP

(76) Inventor: Collins Solomon Jr., 1501 W. Hill Ave., Fullerton, CA (US) 92833

( * ) Notice: Subject to any disclaimer, the term of this patent is extended or adjusted under 35 U.S.C. 154(b) by 0 days.

(21) Appl. No.: 10/751,068

(22) Filed: Jan. 5, 2004

(65) Prior Publication Data

US 2005/0145106 A1    Jul. 7, 2005

(51) Int. Cl.
*F16J 1/00* (2006.01)
*E21B 7/00* (2006.01)

(52) U.S. Cl. .............. 92/172; 92/248; 92/255; 222/386; 175/20

(58) Field of Classification Search ............. 92/172, 92/248, 250, 255; 175/20; 222/386
See application file for complete search history.

(56) References Cited

U.S. PATENT DOCUMENTS

| | | | |
|---|---|---|---|
| 1,769,061 A | 7/1930 | Hitchcock | |
| 2,259,644 A | 10/1941 | Kling | |
| 2,267,064 A | 12/1941 | Wikelund | |
| 2,456,092 A | 12/1948 | Storevik | |
| 3,707,197 A * | 12/1972 | Walesch et al. | 175/245 |
| 4,053,955 A | 10/1977 | Canham | |
| 4,096,749 A * | 6/1978 | Stewart | 73/864.45 |
| D269,844 S * | 7/1983 | Hackerson | 175/249 |
| 4,729,437 A * | 3/1988 | Zapico | 175/20 |
| 4,819,735 A * | 4/1989 | Puckett | 172/72 |
| 5,505,098 A * | 4/1996 | Turriff et al. | 175/20 |

* cited by examiner

*Primary Examiner*—Thomas E. Lazo

(57) ABSTRACT

An adjustable piston pump for displacement and extraction of remnant from soft sand and or soft soil includes a pump casing cylinder that is capped at one end and opens at the other end. It includes a handle fixed to the pump casing cylinder, a shaft rod, a shaft rod handle and a piston that includes a flexible ball. The shaft rod is retractable through the center of the capped end of the pump casing cylinder and is connected to a shaft rod handle. The portion of the shaft rod that always remains embodied in the pump casing cylinder is connected to a piston. The flexible ball mounted inside the piston construction is compressed or decompressed by the clockwise or counter clockwise rotation of the handle located at the other end of the shaft rod. Pressure is controlled in this manner. Upward and downward strokes of the piston initiate displacement and extraction of remnant.

3 Claims, 2 Drawing Sheets

FIG. 4
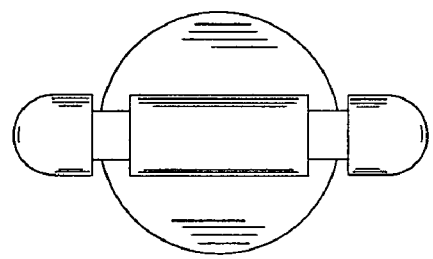
FIG. 2       FIG. 1       FIG. 3
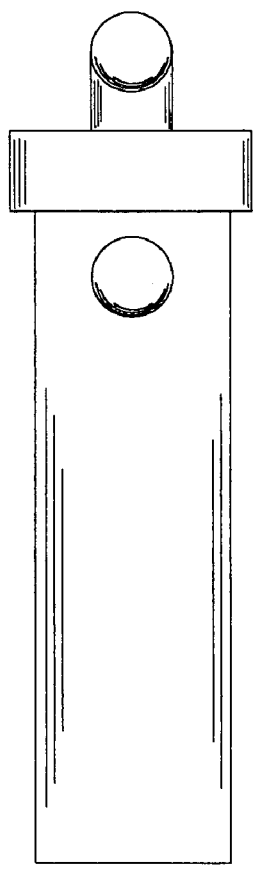 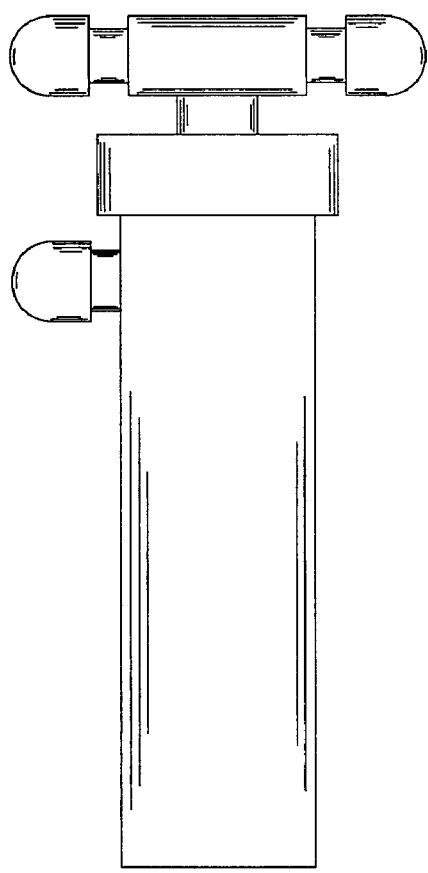 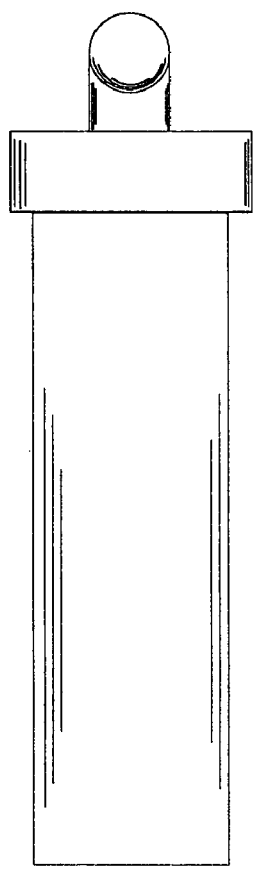
FIG. 5
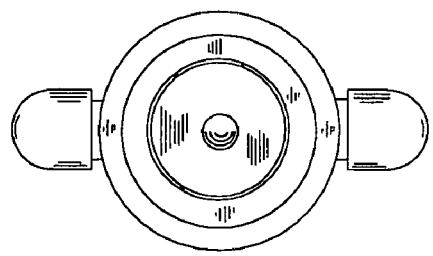

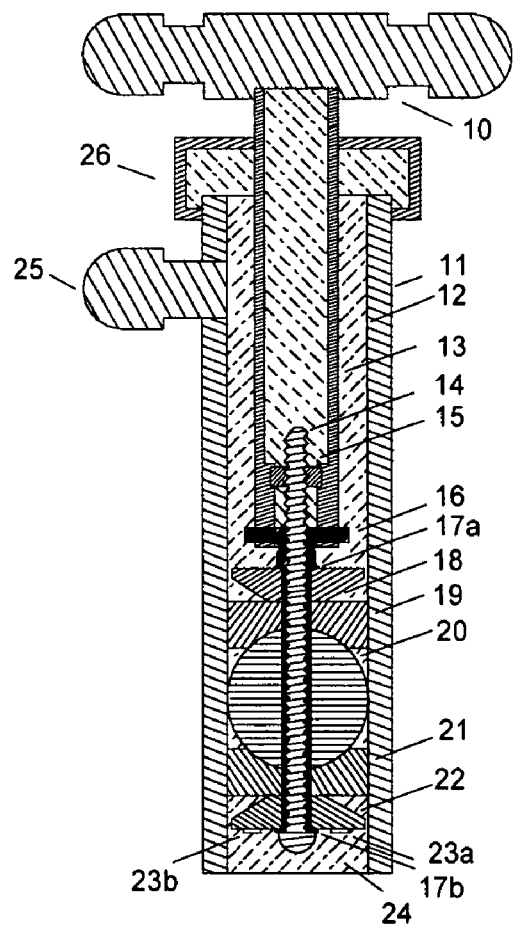
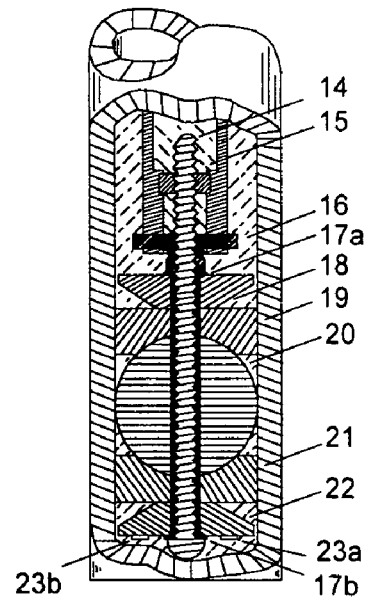
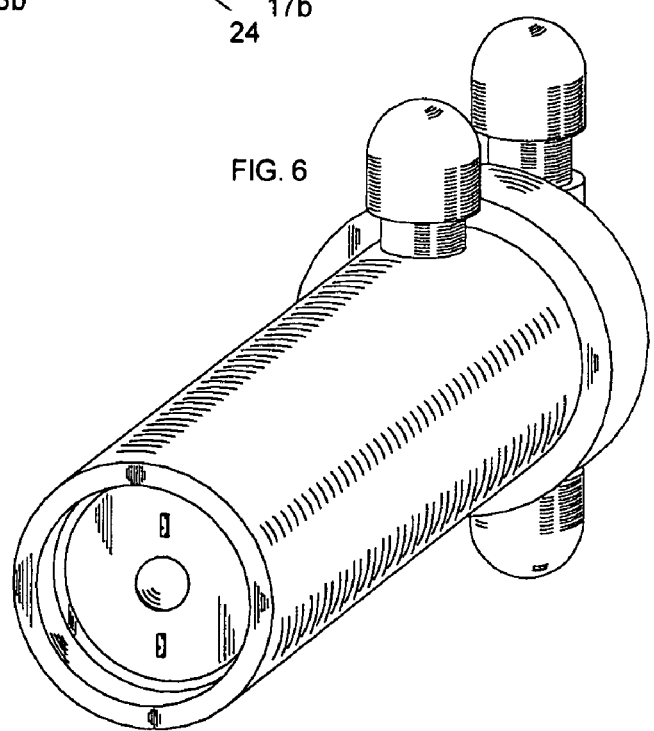

ADJUSTABLE PISTON PUMP

BACKGROUND OF THE INVENTION

1. Field of the Invention

This invention relates to manually driven piston pumps; specifically, to such pumps used for displacement and extraction purposes.

2. Brief Description of Prior Art

Retail stores commonly supply consumers with pumps for the cleaning, flushing and removal of debris from indoor and outdoor pipes. Gas and or water is used with these pumps to discharge the debris contained in them. These pumps are usually equipped with pistons that sacrifice flexibility for durability. As a result, these pistons are short lived and in regular need of repair or replacement. Many consumers are in need of a pump that not only addresses these problems but is also capable of extraction and or collection of samples as well.

Some pumps supplied by retail stores are pumps that must be installed as part of the pipes' flow system to function properly. These pumps are limited to the flushing of material from pipes using only a unidirectional flow pattern. In addition, they must be charged with a source of pressurized gas or water for flushing purposes to relieve plugging and to restore free flow. U.S. Pat. No. 1,769,061 to Hitcock (1930) submits an expensive construction that uses air injected into a pipe opening for flushing purposes. This design is a method of injecting rather than extracting using a piston of sort with no means of making pressure adjustments. U.S. Pat. No. 4,053,955 to Canham (1948) shows an expensive construction with a hydraulic plunger with springs attached. This construction opens into a clogged drain pipe for cleaning purposes and is also unidirectional with no extraction and piston adjustment capability. These and all previously referred to pumps suffer from a number of disadvantages:

1. These pumps are unidirectional. They are displacement pumps that do not lend themselves to retrieval by extraction.
2. These pumps have piston seals that, in some cases, may or may not be adjustable. Pumps with adjustable seals would require proper tools to make these adjustments. Depending on the purpose of their use, some of these pumps might require proper attire to make these adjustments. Proper attire, although it reduces the chance of contamination may also add to the cost factor. Extra costs are incurred in many cases. Pumps with piston seals that are not adjustable may require a new piston seal or complete pump replacement may be necessary.
3. These pumps are not suitable for use apart from the pipe environment. They are used primarily for the cleaning of pipes and or the unplugging of debris from these pipes.

It is an object of the present invention to provide:

1. A closure that is bidirectional and can be used for both displacement and extraction purposes.
2. A closure with an adjustable piston seal that permits regulation of the pump seal and minimizes replacement costs while at the same time eliminating the necessity to handle contaminated areas of the pump.
3. A closure that makes it possible to extract remnant from holes in soft sand and or the remnant from holes in soft soil.

BRIEF DESCRIPTION OF THE DRAWINGS

FIG. 1 is a front view of a pump;
FIG. 1A is a vertical sectional view of a pump.
FIG. 1B is a view of a pump partly in section showing a piston.
FIG. 2 is a left side view of a pump.
FIG. 3 is a right side view of a pump.
FIG. 4 is a top view of a pump.
FIG. 5 is a bottom view of a pump; and
FIG. 6 is a perspective view of a pump.

REFERENCE NUMERALS IN DRAWINGS 10 shaft rod handle
11 pump casing
12 pump casing inner wall
13 shaft rod
14 threaded bolt
15 threaded top nut
16 threaded bottom nut
17a top washer
17b bottom washer
18 upper seal ball retainer
19 top sweep pad
20 piston ball
21 bottom sweep pad
22 lower seal ball retainer
23a adjustment post pad
23b adjustment post pad
24 retainer area
25 casing handle
26 casing cap

DESCRIPTION OF THE PREFERRED EMBODIMENT

Referring to FIG. 1A (a cross sectional view of FIG. 1), a piston pump consists of shaft rod handle 10 connected to shaft rod 13 encased in pump casing 11. Pump casing 11 is capped with casing cap 26 and equipped with casing handle 25. Shaft rod 13 secures top nut 15 and retains bottom nut 16 located at the bottom of shaft rod handle 10. When shaft rod handle 10 is held in position together with casing handle 25 and shaft rod handle 10 is rotated in a clockwise direction contraction occurs. Threaded top nut 15 and threaded bottom nut 16 engage in unison and manipulate threaded bolt 14 in an upward direction. Threaded bolt 14 is manipulated upward through the center of shaft rod 13 and threaded bolt 14 forces top washer 17a and bottom washer 17b to attract and contract all within. Upper seal ball retainers 18 and upper top sweep pad 19 attract to lower seal ball retainer 22 and bottom sweep pad 21, respectively. Piston ball 20 is compressed to a deformed state causing increased pressure against pump casing internal wall 12 and in retainer area 24.

When shaft rod handle 10 is rotated in a counter clockwise direction the opposite occurs. As threaded bolt 14 is manipulated downward, retraction instead of contraction is induced and piston ball 20 is decompressed back to its natural state. The pressure applied against pump casing inner wall 12 and the pumping pressure and or suction pressure in retainer area 24 is decreased. Once the proper pressure adjustment is made and the pump placed in position, shaft rod handle 10 is engaged and disengaged alternately. This alternating action initiates remnant displacement from holes in soft sand or soil and or the extraction of remnants from holes in soft sand or soil. Extracted remnants are collected and stored in retainer area 24. Core samples can also be collected in this manner and stored in area 24. The adjustable post 23a and 23b are included as added leverage to start the process and manipulation of the adjustable piston on threaded bolt 14, if necessary.

What is claimed is:

1. An adjustable piston pump for displacement and or extraction of remnant from soft soil and or soft sand comprises: a pump casing cylinder with handle for support, a shaft rod with a handle and an adjustable piston, wherein the pump casing cylinder is open at one end, capped at the other end and accepts a movable shaft rod through the center of the capped end of the pump casing cylinder, the shaft rod is retractable through the center of the capped end of the pump casing cylinder and is connected to a shaft rod handle, the end of the shaft rod that connects to said shaft rod handle extends outside the capped end of the pump casing cylinder, the portion of the shaft rod that extends through the capped end of the pump casing cylinder and inside the body of the pump casing cylinder is attached to a movable adjustable piston that contains a flexible ball therein, and the force applied to the flexible ball of the adjustable piston is governed by rotating said shaft rod handle clockwise or counter-clockwise followed by the upward and downward pumping of the shaft rod.

2. An adjustable piston pump for displacement and or extraction of remnant from soft soil and or soft sand as claimed in claim 1, wherein said flexible ball permits regulation of the pumping pressure as said shaft rod handle is rotated clockwise or counter-clockwise, said shaft rod handle turned in a clockwise direction compresses and deforms the flexible ball and wedges the flexible ball more tightly against the inside wall of the pump casing cylinder providing increased pumping power for bi-directional displacement and or extraction of remnant, and said shaft rod handle turned in the counter-clockwise direction conforms the flexible ball back to its original state subsequently decreasing pumping power.

3. An adjustable piston pump for displacement and extraction of remnant from soft soil and or soft sand as claimed in claim 1, wherein remnant from soft sand and or soft soil is displaced or extracted with each stroke of the shaft rod, a quick downward stroke displaces remnant and a quick upward stroke extracts remnant, remnant is flushed from within the holes of soft sand and or soft soil, a core sample is extracted from soft sand and or soft soil as well as remnant from within the holes of soft sand and or soft soil, and the core sample and remnant are retained in the open end area of the pump casing cylinder for storage.

* * * * *